United States Patent [19]

Clements

[11] Patent Number: 5,523,042
[45] Date of Patent: Jun. 4, 1996

[54] METHOD OF MAKING PLASTIC PLATE WITH ROLLED EDGE RIM

[75] Inventor: Jack Clements, Gurnee, Ill.

[73] Assignee: Solo Cup Company, Highland Park, Ill.

[21] Appl. No.: 323,497

[22] Filed: Oct. 13, 1994

Related U.S. Application Data

[63] Continuation-in-part of Ser. No. 15,811, Feb. 10, 1993, abandoned.

[51] Int. Cl.[6] ............................................... B29C 53/34
[52] U.S. Cl. ............................................ 264/296; 264/322
[58] Field of Search ................................. 264/296, 322

[56] References Cited

U.S. PATENT DOCUMENTS 4,391,768   7/1983   Arends et al. ..................... 264/296 X Primary Examiner—Leo B. Tentoni
Attorney, Agent, or Firm—McAndrews, Held & Malloy, Ltd.

[57] ABSTRACT

Molded plastic plates having a rolled edge rim and a method of rolling the edges of molded plastic plated. The plastic plates are pre-molded with lugs that project outwardly from the sides of the plates. The lugs of one plate contact the rim of the next successive plate in a stack of plates to create a gap between the plates stacked one on top of another. The gap allows each individual plate to be picked up by the threads on a plurality of threaded rollers which press on the rim of the plate to form the rolled edge.

7 Claims, 4 Drawing Sheets

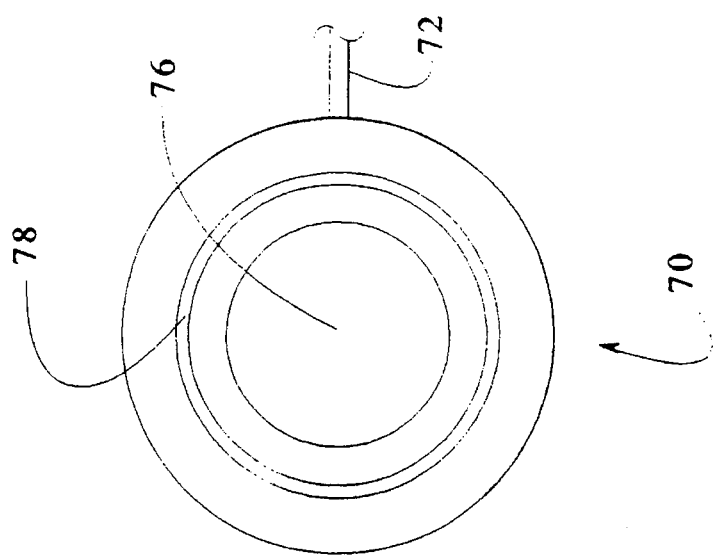
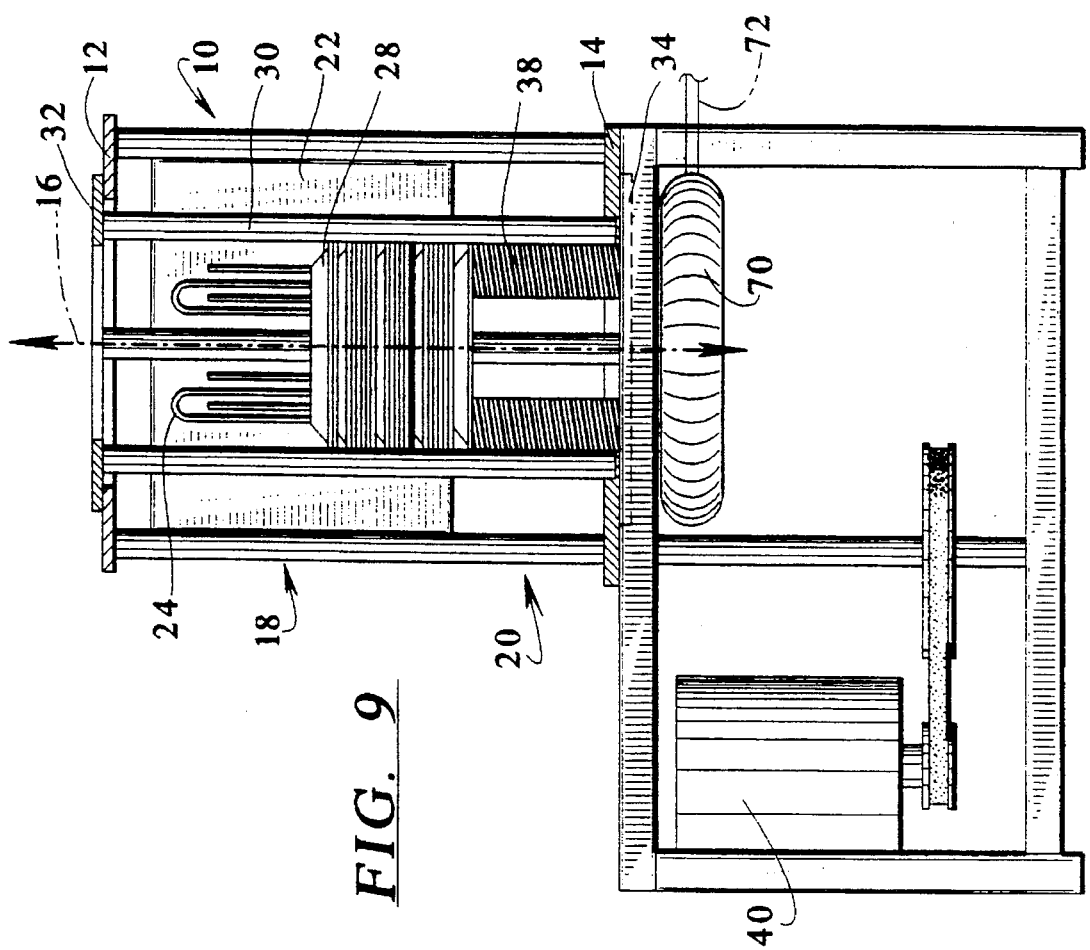

5,523,042

METHOD OF MAKING PLASTIC PLATE WITH ROLLED EDGE RIM

RELATED CASES

This application is a continuation-in-part of application Ser. No. 08/015,811, filed Feb. 10, 1993, now abandoned.

BACKGROUND OF THE INVENTION

The present invention relates to plastic plates, and, more particularly, to molded plastic plates that are intended to be used and then disposed of. Such plates are often used at buffets or picnics and the like, or for meals where a large number of people make it impractical to use non-disposable plates. Typically, the plates are stacked, one on top of another, for use at such events, so that a person can select a plate and then serve himself.

Although the prior art plastic plates are useful for their intended purpose, they suffer from several disadvantages. When the plates are stacked, there is little or no clearance between the plates creating difficulty in picking up just a single plate. Often two or three plates are picked up at a time instead of one, causing excessive waste. Moreover, the edges of the plates are somewhat sharp and can cause cuts in the fingers when the plates are separated from the stack or otherwise handled.

Providing the prior art plastic plates with rim edges that are folded under, or rolled, would solve the problem of sharp plate edges. However, heretofore those working in the molded plastic plate art have not been able to manufacture plates with rolled edges. One reason is that a rolled rim cannot be molded into the plate because of the difficulty in removing the molded plate from the mold. The rolled or folded-under edge creates a double layer of plastic at the edge of the plate and the plate cannot be lifted or dropped out of the mold without disturbing one or the other layers.

Nor has it been feasible to roll or fold under the edges of pre-molded prior art plastic plates. Although various apparatuses have been used to roll the edges of pre-molded plastic cups, they have not been successfully used with plastic plates. That is because, unlike plastic cups, which have a natural separation between their rims when stacked, due to the truncated cone shape of the cup, prior art plates lie flat on top of each other with no separation therebetween, like playing cards in a deck. The lack of separation between plates prevents a positive pick-up of each individual plate by a rolling apparatus, resulting in several plates having their edges rolled together. Moreover, it is not economically feasible to introduce one plate at a time into a rolling apparatus, since that results in an excessively slow production rate, creating a product that is too expensive to make, given the relatively low cost of plastic plates to a consumer.

SUMMARY OF THE INVENTION

Accordingly, it is an object of the invention to provide a plastic plate that eliminates the sharp edges that exist on prior art plates.

A related object of the invention is to provide a plastic plate that does not lie flat against the next successive plate in a stack so that there is a gap between the rims of the plates that allows a single plate to be picked up at a time.

Another object of the invention is to provide a cost-effective method of rolling the edge of the rim of a pre-molded plastic plate.

These and other objects are attained by the present invention which provides a disposable molded plastic plate comprising a bottom surface and sidewalls having a bottom end integral with the bottom surface and a top end terminating in a rim having a rolled outside edge. The sidewalls include a plurality of lugs which project outwardly from the sidewalls a sufficient distance to maintain the rim in a raised position above the rim of a plate stacked immediately below the plate, thereby creating a gap between the rims of the plates.

The rolled edge molded plastic plate of the invention is made by a method comprising:

(a) forming a plurality of lugs in the sidewalls of the plate so that the lugs project outwardly from the sidewalls a sufficient distance to maintain the rim of the plate in a raised position above the rim of a second plate stacked immediately below the plate, thereby creating a gap between the rims of the plates;

(b) heating the rim of the plate to a sufficient temperature to soften the plastic;

(c) passing the plate to a plurality of vertical rollers spaced about a central longitudinal axis so that the rollers are generally parallel to and spaced from the central longitudinal axis a distance approximately equal to the radius of the plate, the rollers having a plurality of threads spirally positioned about the circumference of the rollers, with the distance between the top most thread and the next adjacent thread on each roller being approximately equal to the distance of the gap between the rims of adjacent plates;

(d) rotating the threaded rollers simultaneously about their axes to engage the rim of the plate on the top-most thread and to cause the threads of the rollers to carry the plate downward the length of the threaded rollers, the distance between threads on each threaded roller becoming progressively smaller from top to bottom of the roller, so that as the plate is carried downward by the threads, the rim is gradually squeezed between successive threads on each threaded roller, forming a rolled edge on the rim.

The method of rolling the edges on molded plastic is cost-effective, since the gap between successive plates in a stack permits a positive pick-up of an individual plate by the threads of the rolling screws, allowing a whole stack of plates to be introduced into the rolling apparatus at one time.

The invention will now be described in further detail by way of example with reference to the following drawings.

BRIEF DESCRIPTION OF THE DRAWINGS

The preferred embodiment of the present invention is shown in the accompanying figures in which:

FIG. 9 illustrates a rim-rolling apparatus.

FIG. 10 illustrates a portion of a rim-rolling apparatus.

DETAILED DESCRIPTION OF THE PREFERRED EMBODIMENT

Figure 1:
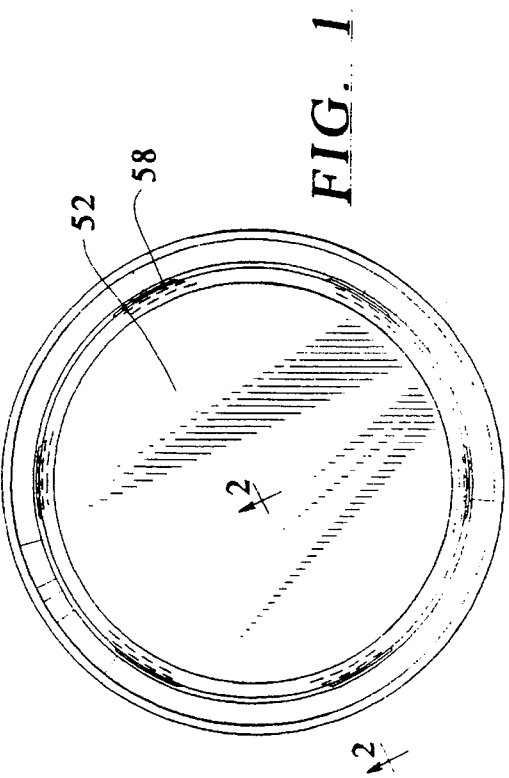
FIG. 1 is a top plan view of a stack of the plastic plates of the present invention, showing the lugs of successive plates in the stack in phantom.
Figure 2:
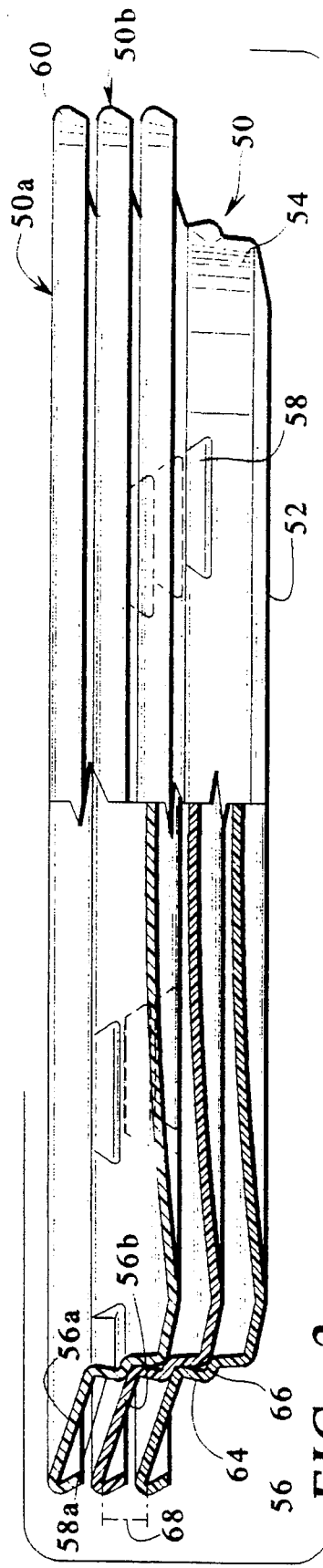
FIG. 2 is a partial cross-sectional view taken along the line 2—2 in FIG. 1.

Referring to FIGS. 1–2, a molded plastic plate having a rolled edge rim according to the invention is shown generally at 50. The molded plastic plate may be made from many types of plastic materials, such as, for example, styrene, (PET-P.P.)

The plate has a flat circular bottom 52, a substantially vertical sidewall 54 integral with the outside edge of the bottom 52 and a rim 56 extending outwardly from the top edge of the sidewall 54 at an acute angle relative to the sidewall. The sidewall 54 is provided with a plurality of lugs 58 that are spaced about the circumference of the sidewall and project outwardly therefrom. The lugs 58 are molded into the plate at the time the plate itself is molded. The rim 56 has an outside edge 60 that is rolled under and toward the center of the plate, resulting in a plastic plate that has no sharp edges like the prior art plastic plates illustrated in FIG. 3. A conventional raised decorative pattern (not shown) may be molded on the rim to improve handling of the plate and reduce the chance of the plate slipping out of a person's fingers.

An important feature of the plastic plate of the invention is the lugs 58. Each of the lugs 58 has an upper surface 64 that is angled outwardly and downwardly from the outside surface of the sidewall 54 and a lower surface 66 that is angled outwardly and upwardly from the outside surface of the sidewall to meet with the upper surface 64. Thus, the lugs 58 have a triangularly shaped profile, as shown in FIG. 2.

The lugs project outwardly from the sidewall of the plate 50 a distance sufficient to permit the lugs to contact the rim of a second identical plate stacked immediately below the plate. Generally, the distance the lugs project outwardly from the sidewall 54 is about ⅛ inch.

In FIG. 2, the top plate 50a has lugs 58a that contact the rim 56b of plate 50b stacked immediately below the top plate 50a and suspend the plate 50a above the second plate 50b so that the rims of the plates 50a and 50b are separated by a gap 68. The size of the gap 68 is about ⅛ to ¼ inch and allows the top most plate in a stack to be easily picked up and separated from the remaining plates in the stack.

Figure 3:
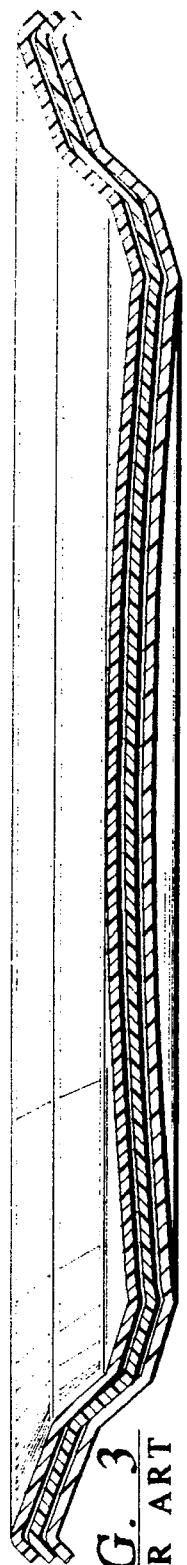
FIG. 3 is a longitudinal cross-sectional view of a stack of prior art plastic plates.

The distance the lugs 58 project outward and the size of the gap 68 distinguish the plates of the present invention from the prior art plates shown in FIG. 3. With respect to the prior art plates, virtually the entire outer plate surface contacts the inner plate surface of the next successive plate in the stack so that there is little or no clearance between the plates, resulting in difficulty in picking up just the top-most plate in the stack.

The lugs 58 are spaced around the circumference of the plate. The lugs of each successive plate are slightly offset from the corresponding lugs of the plate stacked immediately above it in order to prevent the lugs of the top plate from locking inside the lugs of the plate beneath it, thereby losing the gap between the plates. An offset of about 5 degrees between corresponding lugs of successive plates is sufficient to prevent the lugs from interlocking. One method of offsetting the lugs is to mold the plates from several different molds, each mold having the lugs spaced at slightly different intervals.

Figure 4:
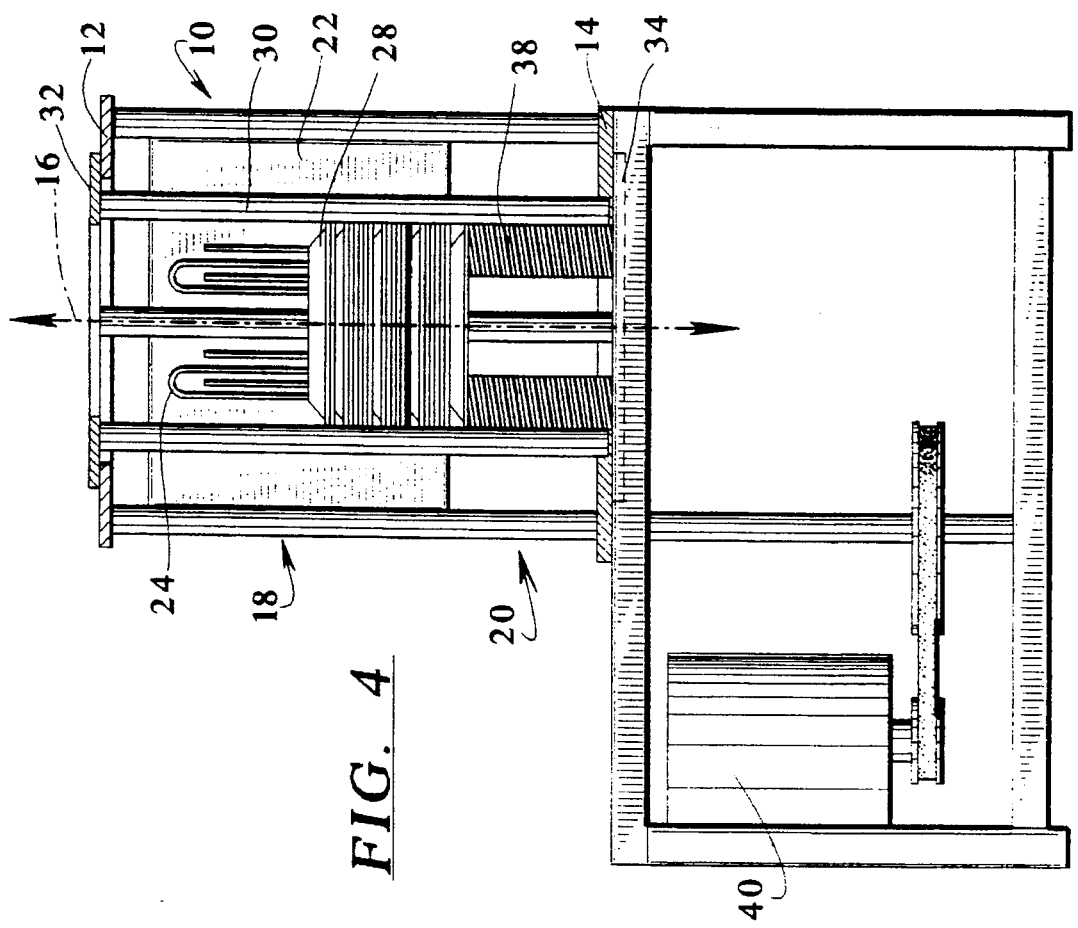
FIG. 4 is a longitudinal cross-sectional view of a rim-rolling apparatus used to accomplish the method of the present invention.

Referring now to FIG. 4, a rim-rolling machine for forming a rolled edge rim on molded plastic plates is shown generally at 10. The rim-rolling machine has a top 12 with an opening therein for receiving the plates to be rim-rolled and a bottom 14 with an opening therein through which the plastic plates having rolled edge rims pass to a conveyor below (not shown). A central longitudinal axis 16 extends between the top 12 and the bottom 14. The rim-rolling machine is divided into two sections, a heating section 18 and a rolling section 20. The heating section 18 is directly above and in communication with the rolling section 20.

The heating section 18 comprises a vertical oven 22 having a plurality of heating elements 24 such as quartz tube heaters, equidistantly arranged about the central longitudinal axis 16. The heating elements 24 are spaced from the axis a distance greater than the radius of the plates and create an open heating zone having a diameter greater than that of the plates. The plates to be rim-rolled, shown generally at 28, travel downward through the heating zone in the oven 22 with the edges of the plates adjacent to the heating elements 24. The heating elements 24 serve to heat the rims of the plates to soften the plastic in preparation for rolling the edges of the rims.

Although quartz tube heaters are preferred, other heating elements, such as ceramic or infrared heating elements, may be employed. Six heating elements 24 have been found suitable for heating the rims of the plates, although any number of heating elements may be used in the oven. The oven temperature is controlled by conventional thermocouple and temperature control instruments (not shown). The temperature varies depending on the type of plastic used for the plates, but is generally within the range of 650°–900° F.

Figure 5:
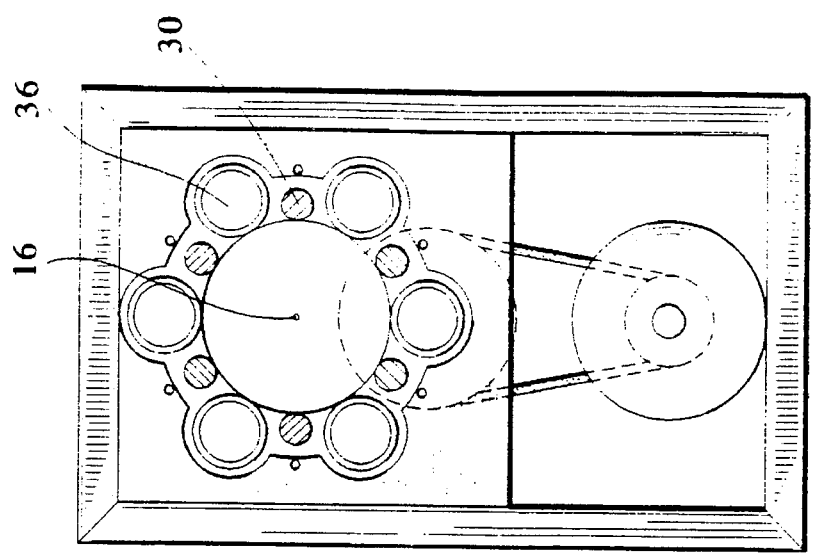
FIG. 5 is a cross-sectional view taken along the line 5—5 in FIG. 4.

A plurality of cylindrically shaped assist rollers 30 are also equidistantly arranged about and generally parallel to the central longitudinal axis 16. The assist rollers 30 extend from the top 12 to the bottom 14 and are spaced from the central longitudinal axis 16 a distance approximately equal to the radius of the plates to be rim-rolled, so that the edges of the plates just touch the assist rollers 30. The assist rollers are preferably made of polished stainless steel and are water cooled to prevent the heating elements 24 from heating the assist rollers to too high of a temperature. Six such assist rollers 30 are illustrated in FIG. 5, although any number of assist rollers may be employed.

As the plates 28 travel downward through the oven 22, the assist rollers 30 engage the rims of the plates and rotate the plates about the central longitudinal axis 16 to insure even heating of the rims and prevent localized over-heating of the plates.

The assist rollers 30 are rotatable about their longitudinal axes, and a variable speed motor 40 of at least ½ horsepower, but preferably 5 horsepower, drives the rotation of the assist rollers 30.

The assist rollers 30 extend into and through the rolling section 20 where they continue to rotate the plates about the central longitudinal axis 16. The rolling section 20 includes a plurality of cylindrically shaped rim rolling screws 36 equidistantly spaced about the central longitudinal axis 16 and alternating with the assist rollers 30. The rim rolling screws 36 are spaced from the central longitudinal axis 16 a distance approximately equal to the radius of the plates to be rim-rolled. Like the assist rollers, the rim rolling screws 36 are rotatable about their longitudinal axes and driven by the variable speed motor 40. The rim rolling screws are also made of polished stainless steel and are water cooled to prevent overheating.

Each of the rim rolling screws 36 has a plurality of threads 38 helically wound about the circumference of the screws. The distance between the top-most thread 38a and the next adjacent thread 38b on each rim rolling screw is approximately equal to the distance of the gap between the rims of adjacent plates in the stack. This is to insure a positive pick-up of a single plate by the top threads of the rolling screws.

The rolling screws 36 are precisely timed so that the top threads of the screws engage the rim of the bottom-most plate in the stack and keep the plate perpendicular to the central longitudinal axis 16. The rolling screws rotate about their axes while the assist rollers 30 rotate the plate about the central longitudinal axis, causing the plate to travel down the flight of screw threads 38. From top to bottom of the rolling screws, the width between the threads 38 on the rolling screws become progressively smaller, so that, as the plate travels down the screw threads, the rim of the plate is gradually squeezed between the successive threads, causing the rim edge to roll back on itself toward the center of the plate.

After the plate travels down the last screw thread, it free-falls onto a conveyor (not shown) where it is counted by a conventional photo-electric counting instrument. Alternatively, mechanical counting screws may be positioned beneath the rim-rolling machine to receive and count the completed rolled edge plates.

The assist rollers 30 and the rolling screws 36 are adjustable relative to the central longitudinal axis 16 to accommodate plates of different diameters. Adjustment is accomplished by the use of a top gate 32, removably mounted to the top 12 of the rim-rolling machine, and a bottom gate 34, removably mounted to the bottom 14 of the rim-rolling machine, as will be explained.

Figure 7:
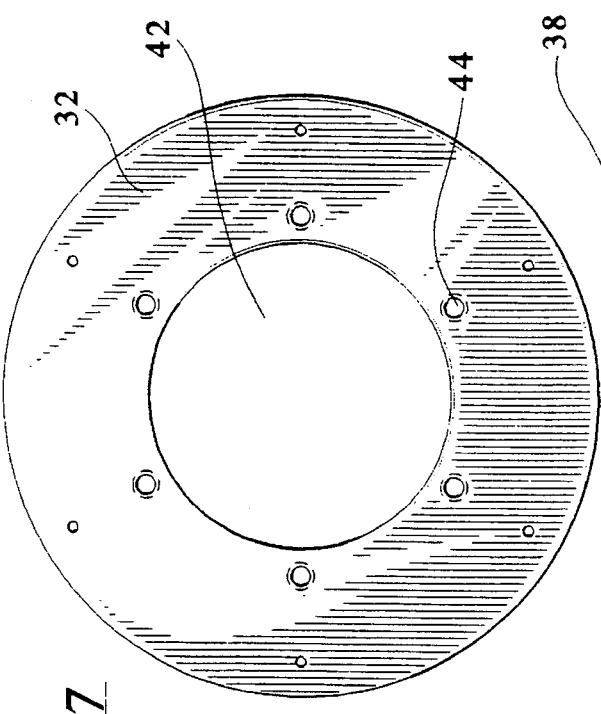
FIG. 7 is a top plan view of the top gate of the rim-rolling apparatus of FIG. 4.
Figure 6:
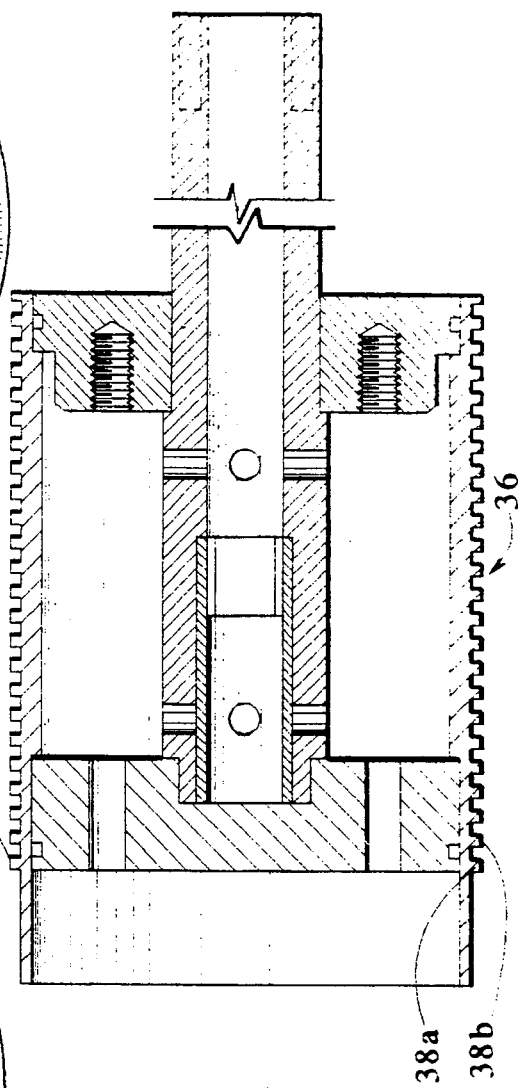
FIG. 6 is a cross-sectional partial view of a rolling screw used in the rim-rolling apparatus of FIG. 4.

Referring to FIG. 7, the top gate 32 has a central aperture 42 that is slightly larger than the diameter of the plates to be rim-rolled, to allow passage of the plates through the aperture when the top gate is mounted to the top 12 of the rim-rolling machine. Tapped holes 44 are equidistantly positioned about the aperture 42, and the assist rollers 30 (shown in FIGS. 4 and 5) are aligned with the tapped holes 44. The assist rollers 30 are fixed into their spaced position about the central longitudinal axis 16, as shown in FIGS. 4 and 5, by the use of fastening means, such as bolts, that are inserted through the tapped holes 44 in the top gate and into the top of the assist rollers 30.

Figure 8:
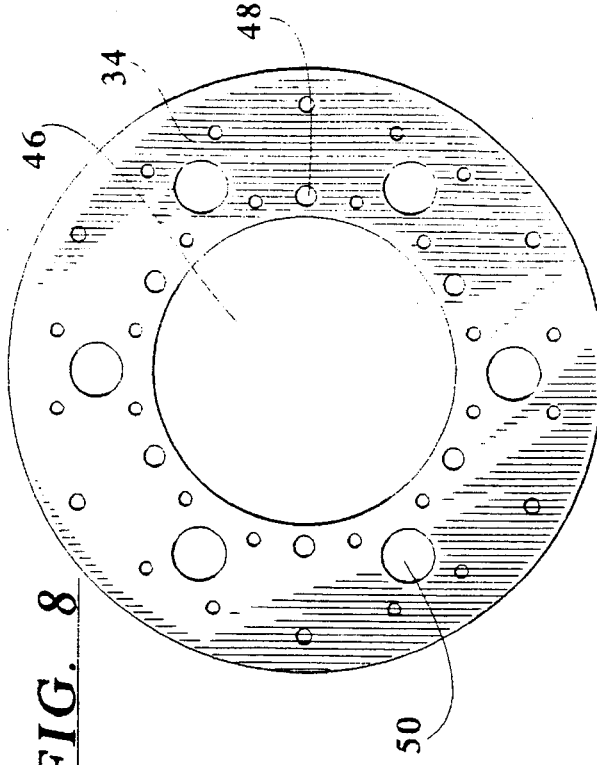
FIG. 8 is a top plan view of the bottom gate of the rim-rolling apparatus of FIG. 4.

Referring to FIG. 8, the bottom gate 34 has a central aperture 46 that is also slightly larger than the diameter of the plates to be rim-rolled, to allow passage of the plates through the aperture when the bottom gate is mounted to the bottom 14 of the rim-rolling machine. The bottom gate 34 is provided with reamed holes 48 that are equidistantly spaced about the aperture 46 and with thru holes 50 equidistantly spaced about the aperture 46 and alternating with the reamed holes 48. The bottom gate 34 is mounted to the bottom of the rim-rolling machine so that the reamed holes 48 are in alignment with the tapped holes 44 in the top gate 32 and the assist rollers 30. Bolts or other fastening means are inserted through the reamed holes 48 and into the bottoms of the assist rollers 30 to fix the assist rollers into position about the central longitudinal axis 16 as shown in FIGS. 4 and 5. The threaded rollers 36 are aligned with the thru holes 50, and bolts or other fastening means are inserted through the thru holes 50 and into the threaded rollers 36 to fix the threaded rollers into position about the central longitudinal axis 16, as shown in FIGS. 4 and 5.

When it is desired to roll the edges of molded plastic plates having a different sized diameter, the top gate 32 and bottom gate 34 are removed and replaced with new top and bottom gates having central apertures that are slightly larger than the new diameter of the plates to be rim-rolled. As will be appreciated by those skilled in the art, there are separate top and bottom gates sized for each different diameter of plate to be rim-rolled to insure proper alignment of the assist roller 30 and rolling screws 36 relative to the edges of the plates.

Referring to FIG. 9, the rim-rolling machine illustrated in FIG. 4 may also be fitted with a vacuum tube 70. Vacuum tube 70 includes nipple 72 which is designed to be connected to a vacuum pump or exhaust fan (not shown) to create a flow of air through vacuum tube 70.

As discussed above, heating section 18 includes heating elements 24 which provide heat so that the plate rims may be rolled. Top 12 in conjunction with top gate 32 substantially traps the heated air inside of rim rolling machine 10. As heated air has a tendency to rise, this condition creates an uneven temperature gradient in the top half of the heating section 18. A controlled, even heat is preferred in order to properly roll a rim on any plastic article, and such an uneven temperature gradient may be detrimental to the rolling process.

Vacuum tube 70 is attached to rim rolling machine 10 adjacent to or on bottom 14 just below bottom gate 34. Vacuum tube 70 is made of any metal suitable for use as a duct.

Referring to FIG. 10, vacuum tube 70 has a circular configuration with nipple 72 extending perpendicularly from the side of vacuum tube 70. Vacuum tube 70 has a central aperture 76 that is larger than the diameter of the plates to be rim-rolled. Aperture 76 will have a diameter at least as large as central aperture 46 of bottom gate 34 (FIG. 8) to allow passage of the plates through aperture 76 when bottom gate 34 and vacuum tube 70 are mounted to bottom 14 of rim-rolling machine 10.

In order to create the airflow, vacuum tube 70 includes slot 78 formed or cut into a portion of vacuum tube 70 to be positioned adjacent bottom 14 and bottom gate 34. The position, shape, and dimension of slot 78 on vacuum tube 70 are not of critical importance so long as they permit adequate airflow from rim-rolling machine 10 into vacuum tube 70 and out through nipple 72 when a vacuum pump or exhaust fan are attached to nipple 72. The airflow requirements are not high, as the purpose of the airflow is merely to reduce hot spots within heating section 18 or anywhere else inside rim-rolling machine 10.

While the invention has been described with reference to a preferred embodiment, it is to be understood that modifications or variations may be easily made without departing from the scope of this invention which is defined by the appended claims.

I claim:

1. A method of forming a rolled edge rim on a molded plastic plate having a bottom, and sidewalls having a top end terminating in a rim and a bottom end integral with the bottom of the plate, the method comprising the steps of:

(a) forming, during the molding of the plate, a plurality of lugs in the sidewalls of the plate and spaced about the circumference of the sidewall so that the lugs project outwardly from the sidewalls a sufficient distance to maintain the rim of the plate in a raised position above the rim of a second plate stacked immediately below the plate, thereby creating a gap between the rims of the plate;

(b) heating the rim of the plate to a sufficient temperature to soften the plastic;

(c) passing the plate to a plurality of vertical rollers spaced about a central longitudinal axis so that the rollers are generally parallel to and spaced from the central longitudinal axis a distance approximately equal to the radius of the plate, the rollers having a plurality of threads spirally positioned about the circumference of the rollers, with the distance between the top-most thread and the next adjacent thread on each roller being approximately equal to the distance of the gap between the rims of adjacent plates; and (d) rotating the threaded rollers simultaneously about their axes to engage the rim of the plate on the top-most threads and to cause the threads of the rollers to carry the plate downward the length of the threaded rollers, the distance between threads on each threaded roller becoming progressively smaller from top to bottom of the roller, so that as the plate is carried downward by the threads, the rim is gradually squeezed between successive threads on each threaded roller, forming a rolled edge on the rim.

2. The method of claim 1 wherein the rim of the plate is heated by passing the plate through a vertical oven.

3. The method of claim 2 wherein the oven is provided with a plurality of vertical rollers spaced from and parallel to a central longitudinal axis through the oven, and the rollers spin the plate about a vertical axis through the center of the plate as the plate is passed through the oven.

4. The method of claim 3 wherein the oven is positioned above the threaded rollers, the vertical rollers extend through the oven and are adjacent to the threaded rollers, and the vertical rollers spin the plate about the vertical axis through the center of the plate as the plate is carried downward by the threads.

5. The method of claim 2 further including the step of forming a stack of the plates, with the rim of each plate in the stack being separated from the rim of each adjacent plate in the stack, and passing the stack of plates through the vertical oven.

6. The method of claim 2 further including the step of creating an air current within the oven in order to maintain the oven at a substantially even temperature.

7. The method of claim 1 further including the step of creating an air current during the molding step of the plate in order to complete the molding step at a substantially even temperature.

* * * * *